US007497230B1

(12) United States Patent
Hawkins et al.

(10) Patent No.: US 7,497,230 B1
(45) Date of Patent: Mar. 3, 2009

(54) PRIMING PUMP WITH REED VALVE

(75) Inventors: Charles W. Hawkins, Sparta, TN (US); Mark T. Wieczorek, Cookeville, TN (US)

(73) Assignee: Fleetguard, Inc, Nashville, TN (US)

( * ) Notice: Subject to any disclaimer, the term of this patent is extended or adjusted under 35 U.S.C. 154(b) by 332 days.

(21) Appl. No.: 11/040,933

(22) Filed: Jan. 21, 2005

(51) Int. Cl.
*F16K 15/14* (2006.01)
*F04B 53/10* (2006.01)

(52) U.S. Cl. .................... 137/512.4; 137/854; 417/440; 417/560; 417/566; 417/571

(58) Field of Classification Search ................. 137/512, 137/512.4, 854; 417/440, 560, 566, 571
See application file for complete search history.

(56) References Cited

U.S. PATENT DOCUMENTS

| | | | | |
|---|---|---|---|---|
| 249,557 | A | 11/1881 | Truesdell | |
| 1,416,771 | A * | 5/1922 | Babson et al. | 137/512.4 |
| 4,437,490 | A | 3/1984 | Demers et al. | 137/512.4 |
| 4,776,776 | A | 10/1988 | Jones | 417/560 |
| 5,016,669 | A | 5/1991 | Jamieson | 137/512 |
| 5,632,607 | A | 5/1997 | Popescu et al. | 417/415 |
| 5,697,770 | A * | 12/1997 | Schulz | 137/512.4 |
| 6,116,866 | A | 9/2000 | Tomita et al. | 417/413.2 |
| 6,932,110 | B2 * | 8/2005 | Mijers | 137/512.4 |
| 2004/0001767 | A1 | 1/2004 | Peters et al. | 417/413.2 |

FOREIGN PATENT DOCUMENTS

| | | | | |
|---|---|---|---|---|
| DE | 3108273 | A1 * | 3/1982 | 137/512.4 |

* cited by examiner

*Primary Examiner*—John Rivell
(74) *Attorney, Agent, or Firm*—Kunzler & McKenzie

(57) ABSTRACT

A fluid priming pump in combination with a reed valve for the control of incoming and exiting fluid flow is disclosed. The fluid priming pump includes a pump body and a movable plunger with the reed valve positioned adjacent the pump body. Two embodiments of the reed valve are disclosed, including an integral design where the unitary valve panel is insert molded with the valve body. In the second embodiment, the unitary reed valve is based on co-injection molding technology. Each reed valve design comprises only two component parts and becomes operable without the need for any additional mechanical components or fasteners. Pressure forces created by the fluid priming pump govern the opening and closing of valve panel portions for controlling the incoming and exiting fluid flow through the fluid priming pump.

24 Claims, 6 Drawing Sheets

PRIMING PUMP WITH REED VALVE

BACKGROUND OF THE INVENTION

The present invention relates in general to priming pumps that are part of fluid systems constructed and arranged to draw in fluid from a supply and deliver the fluid to a downstream site. More specifically, the present invention relates to the use of a valve arrangement to manage and control the flow of fluid through the priming pump. The valve arrangement of the present invention includes a first valving portion on the intake side of the priming pump and a second and cooperating valving portion on the outlet (i.e., delivery) side of the priming pump.

While the present invention is disclosed in the context of a priming pump, some earlier valve designs are used for related fluid pumps, such as the valve plate assembly disclosed in U.S. Pat. No. 4,776,776, issued Oct. 11, 1988 to Jones. The '776 patent is directed to a valve plate assembly for use in small reciprocating piston pumps such as small air compressors used for medical purposes. The '776 patent also includes a background description that covers some of the earlier valve designs and some of the problems associated with those earlier valve designs. For example, one of these earlier valve designs is described in the '776 patent as including a valve plate containing inlet and outlet ports that is mechanically clamped between a cylinder and a cylinder head. As described, valve reeds are riveted or otherwise attached to opposite sides of the valve plate to form check valves which allow air to flow through the inlet port into the cylinder during intake or suction stroke of the piston and to flow through the outlet port during the compression stroke.

As described in the '776 patent, problems are often encountered during manufacture of compressors having reed valves. The prior art valve plate assemblies are relatively expensive to manufacture and tend to leak, which as a consequence reduces the output from the compressor. The metal valve reeds are subject to bending during assembly handling. Therefore, it is necessary to test each compressor after it is assembled and it often is necessary to partially dismantle a newly manufactured compressor to replace a faulty valve plate assembly.

Further, the '776 patent describes the prior art as disclosing valve plate assemblies in which a flat resilient member is clamped over ports. Circular or somewhat parabolic-shaped flaps are cut in the resilient member to form valves attached to the member by resilient hinges. The valves are positioned to cover the ports. This arrangement eliminates some of the problems with reed valves. However, closing of the valve flaps is limited by the limited force exerted by the resilient hinge. Also, additional components, such as a second rigid plate, are required to form both intake and exhaust valves.

The '776 invention is described as being directed to a valve plate assembly for use in small reciprocating piston fluid pumps such as low capacity air compressors. The assembly has a valve plate similar to the prior art valve plate having openings which define inlet and outlet ports. A rubber valve molding is wrapped around the edge of the valve plate to form a seal between the valve plate and the cylinder head. The valve molding has an integral first flap which covers the inlet port opening only on the cylinder side of the valve plate to form an intake check valve and has an integral second flap which covers the outlet port opening only on the cylinder head side of the valve plate to form an outlet check valve.

Another reference of interest for its description of a reed valve assembly is U.S. Pat. No. 4,437,490, issued Mar. 30, 1984 to Demers, et al. The disclosed reed valve assembly includes a reed sandwiched between two base members, such as a valve plate and a cylinder head of a compressor. The reed is clamped between the two members at a central part whereby both free ends of the reed can flex. The base members are so structured that one free end of the reed forms an intake valve member and the other a discharge valve member, whereby a single reed serves both as an intake valve member and as a discharge valve member. The Demers, et al. structure is noticeably different from the present invention in that the single reed must be clamped between two separate components and those two separate components must in turn be joined together by the use of threaded fasteners. Not only is there added size and cost with the Demers, et al. design, but there is the potential for the clamping force to weaken and the reed to loosen or shift position. The integrally molded combination of the present invention and the unitarily molded design of the second embodiment offer improvements to the Demers, et al. design.

While there are other earlier patent references that disclose pump designs and other earlier patent references that disclose cooperating valve assemblies, the '776 and '490 patents should provide a good, basic understanding of how fluid pump valves can be constructed and assembled and how they function.

Since the present invention is disclosed in the context of a priming pump, it should be noted that the priming pumps used today as part of fluid systems employ several different schemes of controlling pump valve action. Each of these different schemes typically require several components to accomplish the task of controlling the valve action at the fluid inlet and the valve action at the fluid outlet (i.e., discharge). As an improvement to these more complicated designs, the present invention focuses on simplicity and a minimal number of parts. As will be described in greater detail, the present invention is configured with a reed valve molded into a carrier device or substrate, without the use of any additional components, connecting hardware, etc. The present invention does not involve any mechanical components, fasteners, or devices to secure the reed valve and valve body or substrate together. The assembled state is achieved by the molding process. The valving system of the present invention works on the pump actions that draw fluid through one valve portion and exhausts it out through the other valve portion. The concept of having no additional parts makes the design of the present invention smaller, more efficient and less expensive compared to other designs in terms of component part reduction and labor cost.

SUMMARY OF THE INVENTION

An integral reed valve for controlling the incoming and exiting fluid flow through a fluid priming pump according to one embodiment of the present invention comprises a molded valve body defining an inlet opening and an outlet opening and a unitary valve panel having a first portion captured within the valve body, a second portion positioned over the inlet opening, and a third portion positioned over the outlet opening, wherein the second and third portions are constructed and arranged to flex in response to pressure forces to alternately open and close the inlet and outlet openings.

One object of the present invention is to provide an improved reed valve for a fluid priming pump.

Related objects and advantages of the present invention will be apparent from the following description.

DESCRIPTION OF THE PREFERRED EMBODIMENTS

Figure 1:
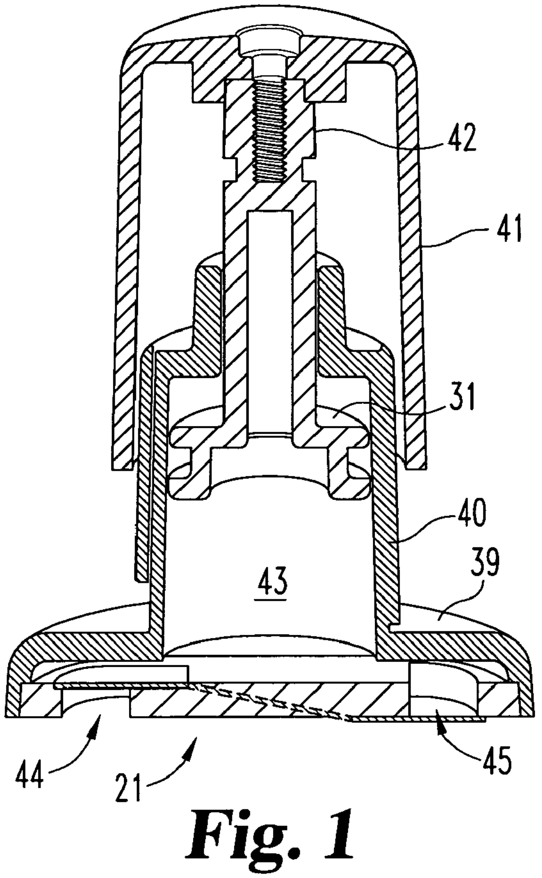
FIG. 1 is a front elevational view, in full section, of a fluid priming pump incorporating a reed valve according to a typical embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a priming pump 20 that includes a reed valve constructed and arranged according to the present invention. There are two primary embodiments of the reed valve according to the present invention. These two primary embodiments are identified herein as reed valve 21*a* and reed valve 21*b*. Reed valve 21*a* is based on insert-molded technology. Reed valve 21*b* is based on co-injection molding technology. Both of these designs are described in greater detail hereinafter. When the invention description is the same for both embodiments, the reference number 21 can be used to denote the generic nature of the reed valve that does not change based on the specific fabrication technology.

Figure 2:
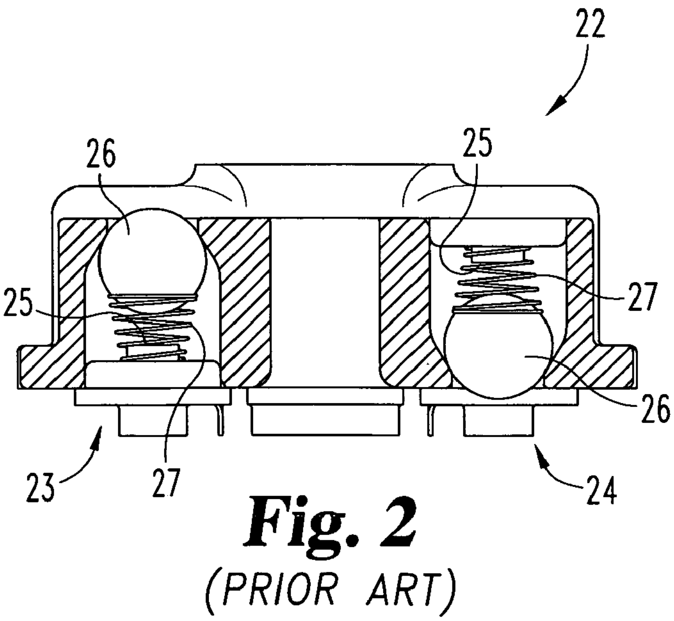
Fig. 2 (PRIOR ART)
FIG. 2 is a front elevational view of a prior art pump valve using a ball valve design.
Figure 3A:
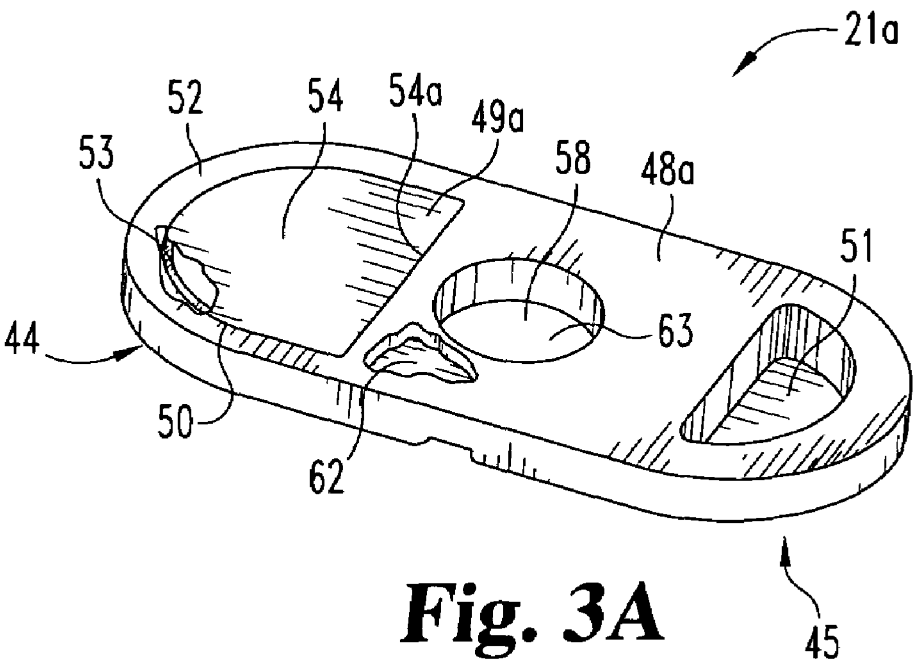
FIG. 3A is a perspective view of a reed valve according to one embodiment of the present invention.
Figure 4A:
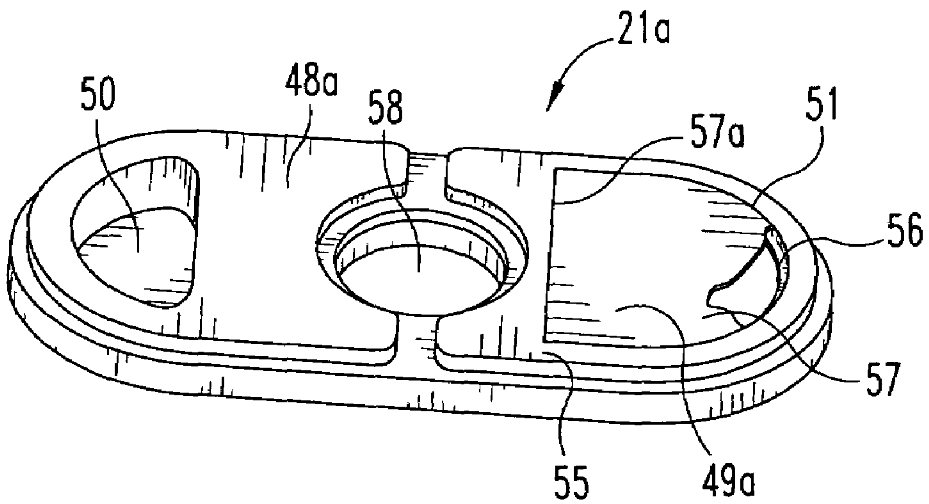
FIG. 4A is a perspective view of the FIG. 3A reed valve according to one embodiment of the present invention.
Figure 3B:
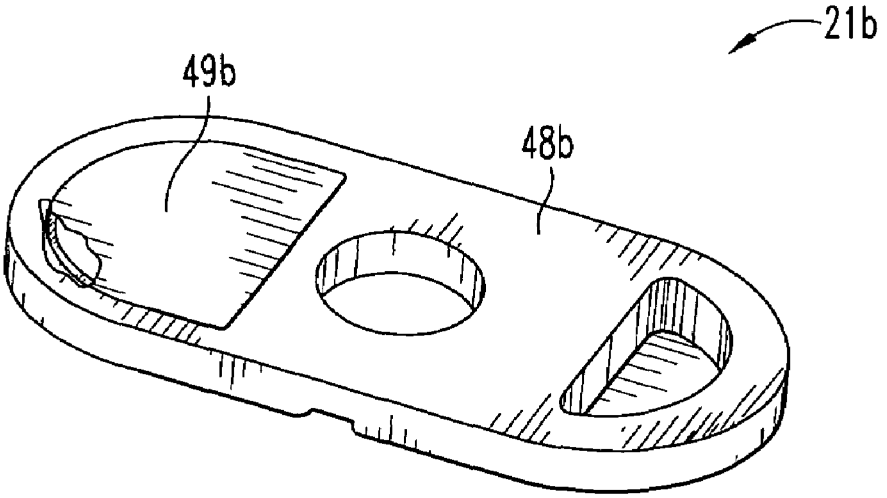
FIG. 3B is a perspective view of a reed valve according to a second embodiment of the present invention.
Figure 4B:
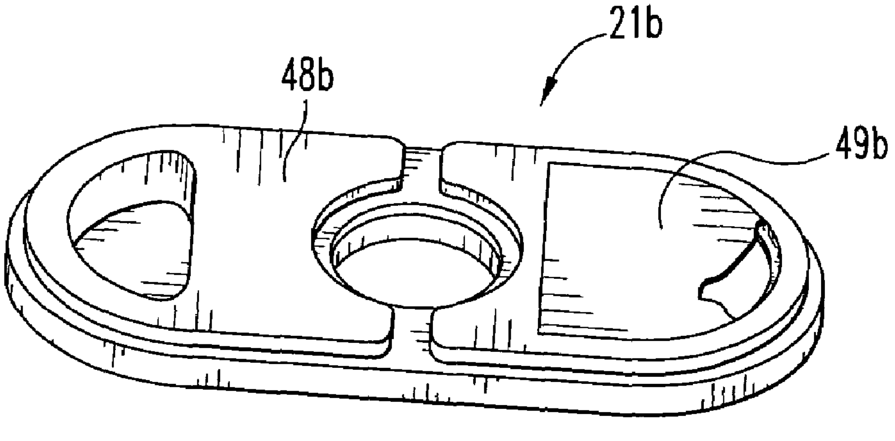
FIG. 4B is a perspective view of the FIG. 3B reed valve according to a second embodiment of the present invention.

While the style of priming pump 20 is considered to be well known, except for the use of reed valve 21, FIG. 2 illustrates a prior art concept for the valving of a priming pump, such as pump 20. The FIG. 2 pump includes a ball valve design. Ball valve 22 includes an inlet side 23 and an outlet side 24. Each side includes a valve seat 25, valve ball 26, and biasing spring 27. These three components are the same on both sides of ball valve 22.

In operation, referring now to both FIGS. 1 and 2 at least in part, discharge pressure created by the downward stroke of a plunger, such as plunger 31, closes off the inlet side by pushing valve ball 26 against the opening in valve seat 25. At the same time, the outlet side remains open as the plunger force pushes the valve ball away from the valve seat. It will be noted that each valve ball 26 is spring biased away from the valve seat and it is the force created by the downward stroke of the plunger that results in closing the inlet and allowing flow to leave the outlet. On the upstroke of the plunger, suction occurs, closing off the outlet side and allowing fluid to flow in from the inlet side. As can be seen from this prior art design, there is added complexity to the overall structure due to the requirement for several component parts including two of each valve balls, valve seats, and the biasing springs.

The present invention, as illustrated in FIG. 1, is an improvement to the FIG. 2 ball valve structure in terms of design simplicity, reliability, the minimal number of component parts, the resulting smaller size, and the reduced cost as a result of those other improvements. Importantly, the present invention creates the reed valve 21 as a molded combination of a valve insert and a valve body or substrate. Reed valve 21 is positioned in line with the fluid inlet and fluid outlet of priming pump 20 and is seated in housing 39. Housing 39 includes a cylinder 40 that receives plunger 31. Cover 41 is connected to the upper end 42 of plunger 31. Cover 41 extends over and around a portion of cylinder 40 such that as plunger 31 moves axially through cylinder 40, cover 41 is able to move in a similar axial fashion on the outside of cylinder 40. This structure allows cover 41 to be manipulated with a downward stroke to effect priming without any direct handling of the plunger 31.

In order to begin the procedure for utilization of priming pump 20, it is assumed that the priming pump 20 is not yet charged with fluid and that the plunger 31 and correspondingly the cover 41 are in the downward or lower position relative to cylinder 40. As the cover 41 is pulled in an upward direction, the plunger 31 moving upwardly inside the cylinder creates a low pressure area 43 directly above valve 21. This causes the inlet side 44 of reed valve 21 to open while closing the outlet (discharge) side 45. Fluid is thereby drawn up into low pressure area 43. Then, with a downward stroke of plunger 31 by way of cover 41, the volume of fluid is exhausted through the outlet side that is forced open due to the pressure exerted by the plunger 31 movement against the volume of fluid. This plunger stroke causes the inlet side 44 to close, as what was previously the lower pressure side of valve 21 now becomes the high pressure side. The action that has been described positions the plunger 31 and the cooperating cover 41 near the base of cylinder 40, ready for the next fluid intake stroke. With this understanding of the operation of priming pump 20, the specifics of valve 21 that contribute to the design simplicity will now be described.

Referring to FIGS. 3A-7B, there is illustrated reed valve 21 constructed according to the two embodiments of the present invention. The illustrations of FIGS. 3A-7B are intended to generically depict the two embodiments of the present invention. In one embodiment of the present invention, reed valve 21*a* is fabricated based upon insert molded technology. In the other embodiment of the present invention, reed valve 21*b* is fabricated based upon co-injection molding technology.

When using insert molded technology for the reed valve 21*a* of the present invention, the valving panel 49*a* is fabricated first, using a metallic material such as spring steel. The valving panel 49*a* is then positioned within the mold cavity and the plastic body 48*a* is molded around the valving panel in order to create the reed valve 21*a* as illustrated in FIGS. 3A, 4A, 5A, 6A, and 7A. As used herein in the context of the present invention, reed valve 21*a* is described as "integral" due to the integral capture of valving panel 49*a* by the insert molding of plastic body 48*a*.

When using the co-injection molding technology for reed valve 21*b* of the present invention, the valving panel 49*b* is injection molded from a first plastic or composite material. Right after the molding of valving panel 49*b*, the plastic body 48*b* is molded over and around valving panel 49*b*, using a different material in order to create reed valve 21*b* as illustrated in FIGS. 3B, 4B, 5B, 6B, and 7B. As used herein in the context of the present invention, reed valve 21*b* is described as "unitary" due to the combined injection molding to create both components and unitarily join them together.

In the description that follows, reference will be made to only reed valve 21*a*, noting that its various shapes, geometry, and dimensions are effectively the same as those for reed valve 21*b*. Since their operational aspects are identical, using a single reed valve 21*a* as the representative example for both embodiments is acceptable and accurate.

Figure 8:
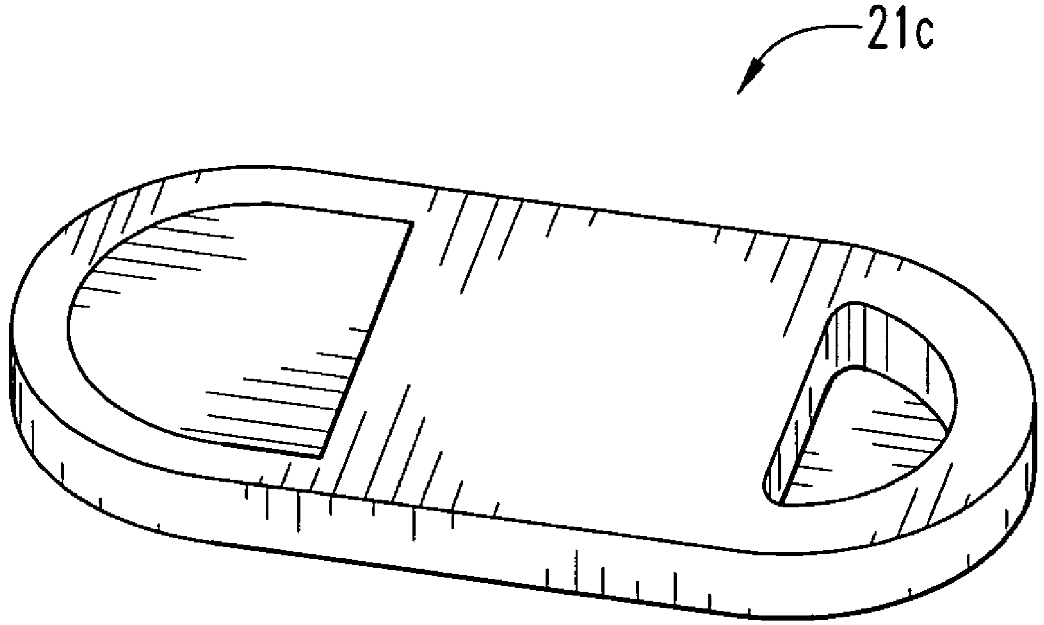
FIG. 8 is a perspective view of an alternate embodiment for the reed valve of the present invention where a control valve opening is not provided.

Plastic body 48*a* includes a semi-circular, offset opening 50 as part of inlet side 44 and an oppositely-disposed, semi-circular, offset opening 51 as part of outlet (discharge) side 45. Opening 50 is enlarged on the upper side 52 of body 48*a* with an inset shelf 53 that receives and seats valve flap portion 54 of panel 49*a*. Opening 51 is enlarged on the underside 55 of body 48*a* with an inset shelf 56 that receives and seats valve flap portion 57 of panel 49*a*. Center opening 58 provides a control valve opening. When a control valve opening is not required, the corresponding reed valve construction is similar to reed valve 21*c* of FIG. 8.

In terms of the two offset openings being oppositely-disposed, they are at opposite ends of body 48*a* and they are reversed in orientation, top to bottom. This construction enables valve flap portion 54 to cooperate with opening 50 for fluid inlet and for valve flap portion 57 to cooperate with opening 51 for fluid outlet in what are identical ways except for the reverse flow directions relative to body 48*a*. It will also be seen that body 48*a* includes a plunger-side surface 48*c* on the top and an oppositely-disposed second surface 48*d*.

Figure 5A:
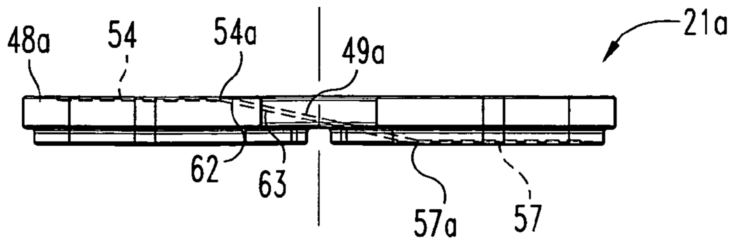
FIG. 5A is a diagrammatic, front elevational view of the FIG. 3A reed valve with both valve portions closed.
Figure 6A:
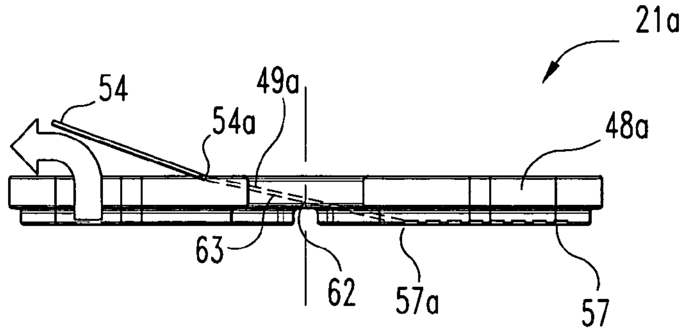
FIG. 6A is a diagrammatic, front elevational view of the FIG. 3A reed valve with the inlet open and the outlet closed.
Figure 7A:
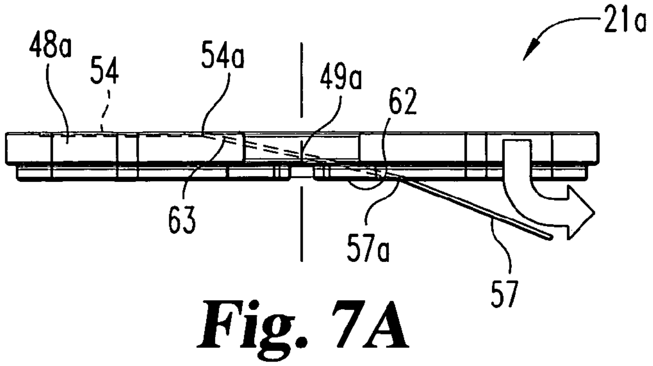
FIG. 7A is a diagrammatic, front elevational view of the FIG. 3A reed valve with the inlet closed and the outlet open.
Figure 5B:
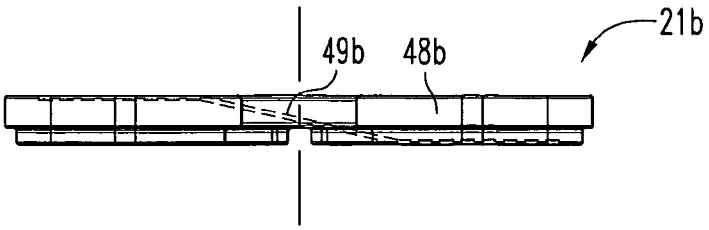
FIG. 5B is a diagrammatic, front elevational view of the FIG. 3B reed valve with both valve portions closed.
Figure 6B:
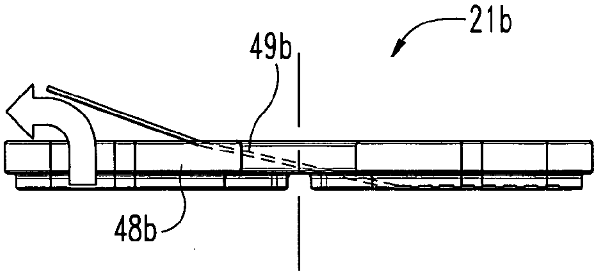
FIG. 6B is a diagrammatic, front elevational view of the FIG. 3B reed valve with the inlet open and the outlet closed.
Figure 7B:
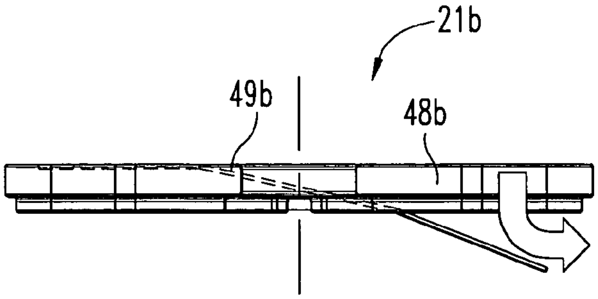
FIG. 7B is a diagrammatic, front elevational view of the FIG. 3B reed valve with the inlet closed and the outlet open.

Valve flap portion 54 fits down into opening 50 and the edge of portion 54 seats against shelf 53. This construction prevents portion 54 from deflecting in the direction of shelf 53. When a low pressure is created by the upward movement of the plunger 31, valve flap portion 54 flexes upwardly, elastically bending along edge line 54*a* that defines one side of portion 54. The upward deflection of portion 54 away from shelf 53 opens the fluid inlet opening 50, allowing fluid to be drawn into the priming pump 20. Due to the reverse construction for valve flap portion 57 and shelf 56, this low pressure pulls portion 57 against shelf 56 so as to seal closed the outlet opening 51. With fluid now held within cylinder 40, a downward stroke of plunger 31 pressurizes the chamber, forcing portion 57 to open and the held fluid to be pushed out the outlet opening 51. The portion 57 flexes downwardly, elastically bending along line 57*a* that defines one side of portion 57. The pressure in cylinder 40 also pushes portion 54 against shelf 53 to seal closed the inlet opening 50. This ensures that effectively none of the fluid in the cylinder is pushed back out through the inlet opening 50. Part of the simplicity of the present invention is provided by having a two-component combination for each of the reed valves 21*a* and 21*b*. This design is created without the use of any mechanical fasteners or added components. The joinder of the two components is by molding, creating an integral combination in the case of reed valve 21*a* and a unitary combination in terms of reed valve 21*b*. The valving panel 49*a* includes a center portion 62 positioned between portions 54 and 57 and extending between the plunger-side surface 52 and the second (underside) surface 55. The lines defining the boundaries of portion 62 are edge lines 54*a* and 57*a*. When a control valve opening 58 is formed in the valve body 48*a*, the center portion 62 is shaped with a similar opening 63, in cooperation with surrounding side sections that connect together portions 54 and 57. As illustrated in FIGS. 5A, 6A, and 7A, the center portion is set at an inclined angle between edge lines 54*a* and 57*a* and is captured in its entirety by the molded plastic of valve body 48*a*.

In some pump designs incorporating reed valve 21*a* and 21*b*, a second valve will be present and control valve opening 58 is provided in those situations. Opening 58 provides clearance for a shaft that cooperates with the second valve. When the reed valve is being used, the second valve is closed. When it is desired to bypass the reed valve, the second valve is used (opened) and the reed valve is bypassed.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An integral reed valve for controlling the incoming and exiting fluid flow through a fluid priming pump, said integral reed valve comprising:

a solid molded valve body defining an inlet opening, a control valve opening and an outlet opening; and a unitary valve panel having a first portion molded within said solid molded valve body, a second portion cantilevered over said inlet opening and a third portion cantilevered over said outlet opening, wherein said second and third portions are constructed and arranged to flex in response to pressure forces to alternately open and close said inlet and outlet openings.

2. The integral reed valve of claim 1 wherein said solid molded valve body defines a plunger-side surface and an oppositely-disposed second surface and said first portion extends through said solid molded valve body from said plunger-side surface to said second surface.

3. The integral reed valve of claim 2 wherein said second portion is positioned against said plunger-side surface.

4. The integral reed valve of claim 3 wherein said third portion is positioned against said second surface.

5. The integral reed valve of claim 4 wherein said inlet opening includes an inset shelf for receiving and seating the second portion.

6. The integral reed valve of claim 1 wherein said unitary valve panel is comprised of a plastic or composite material.

7. In combination:

a fluid priming pump including a pump body and a moveable plunger positioned within said pump body; and an integral reed valve positioned adjacent said pump body for controlling the incoming and exiting fluid flow through a fluid priming pump, said integral reed valve comprising:

a seamless solid molded valve body defining an inlet opening and an outlet opening; and a unitary valve panel having a first fixed portion molded within said seamless solid molded valve body, a second portion cantilevered over said inlet opening and a third portion cantilevered over said outlet opening, the seamless solid molded valve body enveloping the first fixed portion of the unitary valve panel such that the first fixed portion of the unitary valve panel is surrounded by the seamless solid molded valve body, wherein said second and third portions are constructed and arranged to flex in response to pressure forces to alternately open and close said inlet and outlet openings.

8. The combination of claim 7 wherein said seamless solid molded valve body defines a plunger-side surface and an oppositely-disposed second surface and said first portion extends through said seamless solid molded valve body from said plunger-side surface to said second surface.

9. The combination of claim 8 wherein said second portion is positioned against said plunger-side surface.

10. The combination of claim 9 wherein said third portion is positioned against said second surface.

11. The combination of claim 10 wherein said inlet opening includes a shelf.

12. The combination of claim 7 wherein said seamless solid molded body defines a control valve opening.

13. The combination of claim 7 wherein said unitary valve panel is comprised of a plastic or composite material.

14. A unitary reed valve for controlling the incoming and exiting fluid flow through a fluid priming pump, said unitary reed valve comprising:

a seamless solid molded valve body defining an inlet opening and an outlet opening, the inlet opening comprising an inset shelf; and a unitary valve panel having a first portion molded within said seamless solid molded valve body, a second portion cantilevered over said inlet opening and a third portion cantilevered over said outlet opening, the seamless solid molded valve body enveloping the first fixed portion of the unitary valve panel such that the first fixed portion of the unitary valve panel is surrounded by the seamless solid molded valve body, wherein said second and third portions are constructed and arranged to flex in response to pressure forces to alternately open and close said inlet and outlet openings.

15. The unitary reed valve of claim 14 wherein said seamless solid molded valve body defines a plunger-side surface and an oppositely-disposed second surface and said first portion extends through said seamless solid molded valve body from said plunger-side surface to said second surface.

16. The unitary reed valve of claim 15 wherein said second portion is positioned against said plunger-side surface.

17. The unitary reed valve of claim 16 wherein said third portion is positioned against said second surface.

18. The unitary reed valve of claim 14 wherein said seamless solid molded valve body defines a control valve opening.

19. The unitary reed valve of claim 14 wherein said unitary valve panel is metal.

20. In combination:

a fluid priming pump including a pump body and a movable plunger positioned within said pump body; and a unitary reed valve positioned adjacent said pump body for controlling the incoming and exiting fluid flow through a fluid priming pump, said unitary reed valve comprising:

a solid molded valve body defining an inlet opening, a control valve opening and an outlet opening, the inlet opening comprising an inset shelf; and a unitary valve panel having a first portion molded within said solid molded valve body, a second portion cantilevered over said inlet opening and a third portion cantilevered over said outlet opening, wherein said second and third portions are constructed and arranged to flex in response to pressure forces to alternately open and close said inlet and outlet openings.

21. The combination of claim 20 wherein said solid molded valve body defines a plunger-side surface and an oppositely-disposed second surface and said first portion extends through said molded valve body from said plunger-side surface to said second surface.

22. The combination of claim 21 wherein said second portion is positioned against said plunger-side surface.

23. The combination of claim 22 wherein said third portion is positioned against said second surface.

24. The combination of claim 20 wherein said unitary valve panel is metal.

* * * * *